(12) United States Patent
Asanuma et al.

(10) Patent No.: US 7,505,714 B2
(45) Date of Patent: Mar. 17, 2009

(54) IMAGE FORMING DEVICE

(75) Inventors: Shoji Asanuma, Kanagawa (JP); Shuji Tanaka, Kanagawa (JP); Manabu Nonaka, Kanagawa (JP); Kazumasa Ishikawa, Kanagawa (JP); Taku Kudoh, Kanagawa (JP); Hajime Nishida, Kanagawa (JP); Akihiro Fujita, Kanagawa (JP); Yasuhiro Kawashima, Kanagawa (JP); Kenji Kameyama, Tokyo (JP); Yasunobu Youda, Kanagawa (JP); Eiki Yoshimizu, Kanagawa (JP); Shinichiro Naruse, Kanagawa (JP); Yohzoh Dohki, Aichi (JP); Shigeyuki Ito, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 444 days.

(21) Appl. No.: 11/138,489

(22) Filed: May 25, 2005

(65) Prior Publication Data

US 2005/0265749 A1  Dec. 1, 2005

(30) Foreign Application Priority Data

May 28, 2004  (JP)  ............................ 2004-159388

(51) Int. Cl.
G03G 21/00 (2006.01)
(52) U.S. Cl. .................. 399/124; 347/104; 347/108; 358/296; 358/403; 399/21; 399/381; 399/405
(58) Field of Classification Search .................. 399/124
See application file for complete search history.

(56) References Cited

U.S. PATENT DOCUMENTS

| 4,754,337 | A | | 6/1988 | Nohtomi et al. | |
|---|---|---|---|---|---|
| 5,025,326 | A | * | 6/1991 | Shimmyo | ............... 358/498 |
| 5,191,383 | A | * | 3/1993 | Watanabe | ............... 399/124 |
| 5,329,373 | A | * | 7/1994 | Hayashi et al. | ............ 358/296 |
| 5,497,250 | A | * | 3/1996 | Kawashima | ............ 358/498 |
| 5,583,611 | A | | 12/1996 | Rutishauser | |
| 5,610,725 | A | * | 3/1997 | Kawada et al. | ............ 358/403 |
| 5,768,448 | A | | 6/1998 | Ichinose | |
| 5,833,381 | A | * | 11/1998 | Kellogg et al. | ............ 400/624 |
| 5,839,025 | A | * | 11/1998 | Okauchi et al. | ............. 399/92 |
| 6,011,936 | A | * | 1/2000 | Kaneko | ................. 399/21 |
| 6,102,506 | A | | 8/2000 | Sasai et al. | |
| 6,147,781 | A | * | 11/2000 | Tanaka et al. | ............. 358/498 |
| 6,182,964 | B1 | * | 2/2001 | Tanaka et al. | .............. 271/199 |
| 6,263,185 | B1 | * | 7/2001 | Kato et al. | ................. 399/381 |
| 6,978,097 | B2 | * | 12/2005 | Ozawa et al. | ................. 399/88 |

(Continued)

FOREIGN PATENT DOCUMENTS

EP  0606628 A2  7/1994

(Continued)

*Primary Examiner*—Luu Matthew
*Assistant Examiner*—John P Zimmermann
(74) *Attorney, Agent, or Firm*—Cooper & Dunham, LLP

(57) ABSTRACT

In an image forming device comprising an image forming part forming an image on a recording sheet, a sheet ejection part provided above the image forming part and stacking the recording sheet on which the image is formed by the image forming part, and an image reading part provided above the sheet ejection part and reading an image of an original document, the sheet ejection part is provided with a cover which is capable of being opened or closed to the sheet ejection part.

10 Claims, 7 Drawing Sheets

U.S. PATENT DOCUMENTS

| | | |
|---|---|---|
| 7,184,182 B1 * | 2/2007 | Kuroda et al. ............... 358/498 |
| 2002/0044810 A1 * | 4/2002 | Sato et al. .................. 399/405 |
| 2002/0081133 A1 | 6/2002 | Sawada |
| 2003/0030847 A1 | 2/2003 | Amemiya et al. |
| 2004/0213590 A1 * | 10/2004 | Schroath et al. ............... 399/21 |

FOREIGN PATENT DOCUMENTS

JP      8-18762      1/1996

* cited by examiner

IMAGE FORMING DEVICE

CROSS-REFERENCE TO RELATED APPLICATION

The present application is based on and claims the benefit of priority of Japanese patent application No. 2004-159388, filed on May 28, 2004, the entire contents of which are incorporated herein by reference.

1. Technical Field

The present disclosure relates to an image forming device in which a sheet ejection part for stacking a recording sheet is disposed above an image forming part, and an image reading part is disposed above the sheet ejection part.

2. Description of the Related Art

As disclosed in Japanese Laid-Open Patent Application No. 08-018762, there is known the image forming device in which the image reading part which reads an image of an original document set on the contact glass is disposed above the image forming part which forms an image on a recording sheet.

There is also known the image forming device having the composition in which the sheet ejection part for stacking the recording sheet on which the image is formed by the image forming part is disposed between the image forming part and the image reading part. This image forming device is designed to make sure that the sheet ejection part does not outwardly project from the side of the main part of the image forming device, in order to aim at providing a compact image forming device.

However, the following problem may arise in the conventional image forming devices having the composition in which the sheet ejection part for stacking the recording sheet on which the image is formed is disposed above the image forming part (or the printing part). When the jam of a recording sheet occurs in the image forming part or on the sheet conveyance passage between the image forming part and the sheet ejection part, it is difficult for the user to eliminate the jammed sheet from the image forming device.

SUMMARY OF THE INVENTION

An object of the present invention is to provide an improved image forming device in which the above-described problems are eliminated.

Another object of the present invention is to provide an image forming device in which the jammed recording sheet can be easily removed even when the jam of the recording sheet occurs in the image forming part and on the sheet conveyance passage near the image forming part.

In order to achieve the above-mentioned objects, the present invention provides an image forming device comprising: an image forming part forming an image on a recording sheet; a sheet ejection part provided above the image forming part and stacking the recording sheet on which the image is formed by the image forming part; and an image reading part provided above the sheet ejection part and reading an image of an original document, wherein the sheet ejection part comprises a cover which is capable of being opened or closed to the sheet ejection part.

The above-mentioned image forming device may be configured to further comprise a sheet conveyance part conveying the recording sheet on which the image is formed by the image forming part, to the sheet ejection part via a conveyance passage.

The above-mentioned image forming device may be configured so that the sheet ejection part has a sheet ejection tray, and the cover constitutes a part of the sheet ejection tray.

The above-mentioned image forming device may be configured so that the sheet conveyance part is provided to invert the recording sheet on which the image is formed, so that the inverted recording sheet is conveyed to the sheet ejection part.

The above-mentioned image forming device may be configured so that the sheet conveyance part comprises a plurality of conveyance rollers disposed in a lower position, and a guide plate having a plurality of rowel-like rollers disposed to confront the plurality of conveyance rollers.

The above-mentioned image forming device may be configured so that the image forming part is an ink-jet printing part which prints an image on a recording sheet by performing an ink-jet printing process using an ink.

The above-mentioned image forming device may be configured so that the cover is a pivoted cover capable of being opened and closed by a rotating operation.

The above-mentioned image forming device may be configured so that the cover is a double-doored cover having a set of two pivoted plate members which are rotatable in mutually opposite directions.

The above-mentioned image forming device may be configured so that the cover is a sliding-door cover capable of being opened and closed by a slide operation.

The above-mentioned image forming device may be configured so that the cover comprises a pivoted cover capable of opened and closed by a rotating operation, and a sliding-door cover capable of being opened and closed by a slide operation.

The above-mentioned image forming device may be configured so that the cover comprises a set of two plate members, a first rotation shaft, and a second rotation shaft, the first rotation shaft being fixed to a bottom of the sheet ejection part and pivotably supporting one of the set of two plate members on the sheet ejection part bottom, and the second rotation shaft pivotably supporting the other of the set of two plate members on the one of the set of two plate members.

The above-mentioned image forming device may be configured so that the cover is a double-doored cover having a set of two door members which are rotatable in mutually opposite directions.

The above-mentioned image forming device may be configured so that a sheet ejection cover capable of being opened and closed is disposed at a downstream position of the image forming part separate from a position of the cover in the sheet ejection part, and an interlock switch is disposed at the sheet ejection cover, and wherein, when the sheet ejection cover is opened, opening of the cover in the sheet ejection part is inhibited by a result of detection of an opened condition of the sheet ejection cover by the interlock switch.

The above-mentioned image forming device may be configured so that a lighting is disposed near the image forming part, and when the cover is opened, the lighting illuminates a sheet conveyance passage near the image forming part.

The above-mentioned image forming device may be configured so that a mirror is disposed at a position where a lower portion of the sheet ejection part near the image forming part is visually recognizable from an opening which is formed when the cover is opened.

The above-mentioned image forming device may be configured so that the image reading part has a transparent region at a bottom position of the image reading part corresponding to a position of the cover in the sheet ejection part, and when the cover is set in the opened condition, a downstream portion of the image forming part is visually recognizable from the transparent region.

The above-mentioned image forming device may be configured so that a pivoted shutter having a size to cover the whole transparent region is disposed, and the pivoted shutter is capable of being opened and closed.

According to the image forming device of the present invention, the sheet ejection part is provided with a retractable cover which is capable of being opened and closed to the sheet ejection part. Even when the jam of a recording sheet occurs in or near the image forming part disposed below the sheet ejection part which is in turn disposed below the image reading part, the jammed sheet can be removed easily by placing the cover of the sheet ejection part in the opened condition.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will now be given of the preferred embodiments of the invention with reference to the accompanying drawings.

Figure 1:
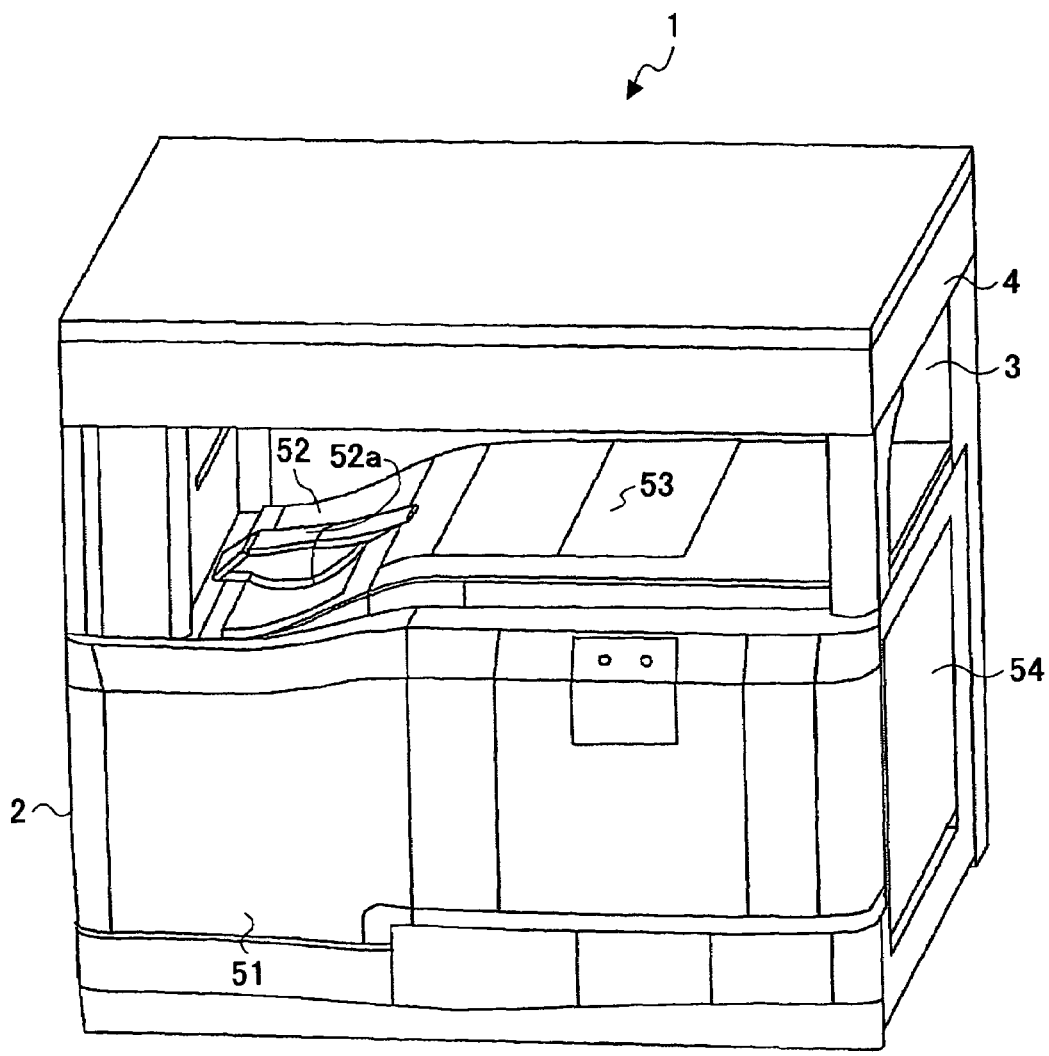
FIG. 1 is a perspective view of the whole composition of the image forming device in one embodiment of the present invention.
Figure 2:
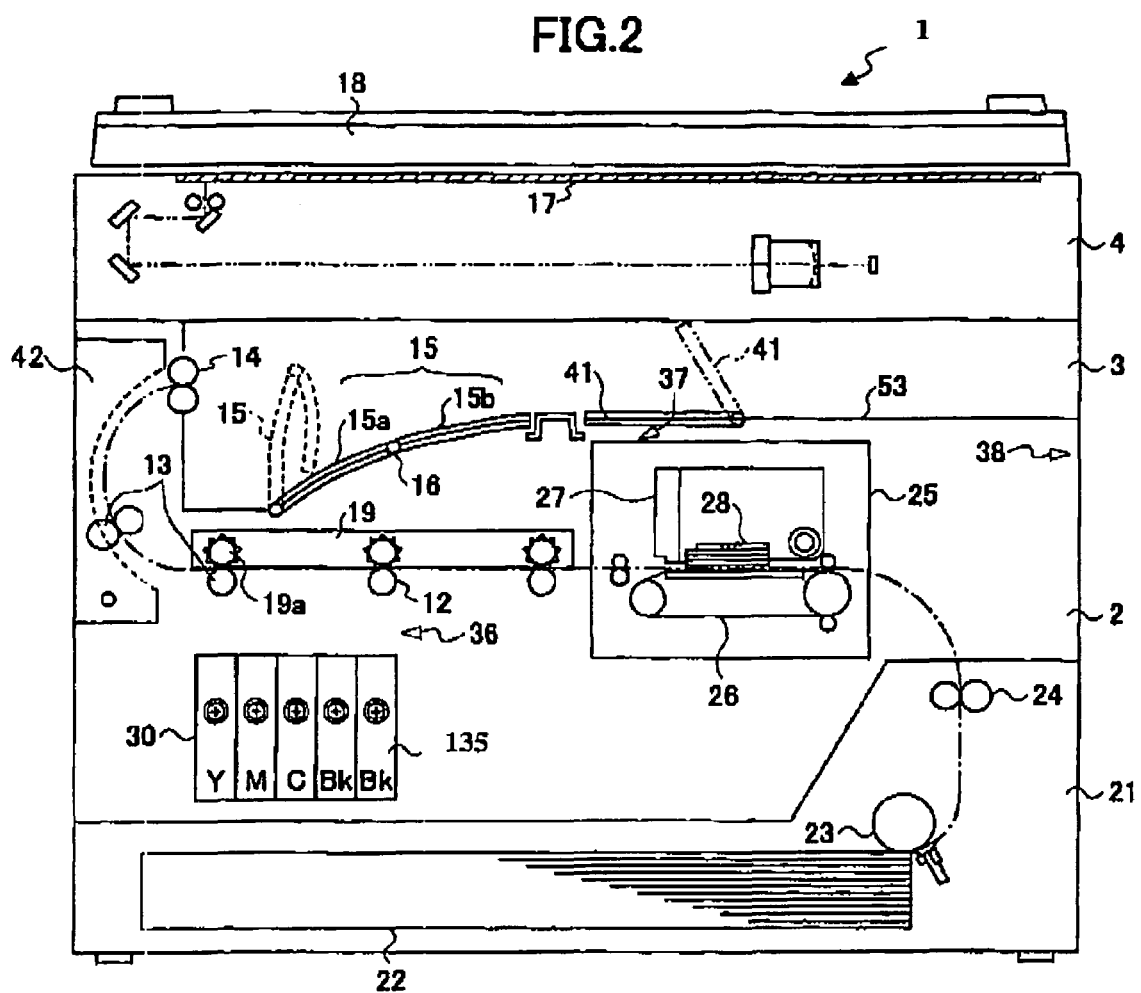
FIG. 2 is a cross-sectional view of the internal composition of the image forming device of FIG. 1.

FIG. 1 is a perspective view of the whole composition of the image forming device in one embodiment of the present invention. FIG. 2 is a cross-sectional view of the internal composition of the image forming device of FIG. 1.

The image forming device 1 of FIG. 1 is, for example, an ink jet-type multi-function peripheral which incorporates the multiple functions including the copy function, the scanner function, the printer function, and the fax function.

The image forming device 1 of FIG. 1 comprises the sheet feeding part 21, the printing part 2 which is the image forming part forming an image on a recording sheet, the sheet ejection part 3 which is disposed above the printing part 2 and stacks the recording sheet on which the image is formed by the printing part 2, and the image reading part 4 which is disposed above the sheet ejection part 3 and reads the image of the original document.

In the sheet feeding part 21, one of the plurality of recording sheets contained in the sheet cassette 22 is separated by the feeding means 23, and the recording sheet from the feeding means 23 is inverted and conveyed to the upper part by the conveyance roller 24 so that the recording sheet is sent to the printing part 2.

As shown in FIG. 1, the side cover 54 is rotatably disposed to the sheet feeding part 21. In the condition in which the side cover 54 is opened, the conveyance passage of the portion where the conveyance roller 24 is disposed is opened to the outside, and the jammed recording sheet on the conveyance passage of this portion is easily removable.

The printing part 2 is disposed above the sheet feeding part 21. The printing part 2 comprises the ink jet engine 25 and the ink cartridge mounting part 30.

The ink jet engine 25 has the electrostatic attraction belt 26, the carriage 27, and the printhead 28. By adopting the recording sheet conveyance system using the electrostatic attraction belt 26, it is possible to provide a more stable sheet conveyance when compared with the conventional roller conveyance system.

The printhead 28 is carried on the carriage 27. An image is formed on the recording sheet when the printhead 28 carries out the two-way movement in the main scanning direction (the direction perpendicular to the paper of FIG. 2).

The printhead 28 of this embodiment comprises four heads of cyanogen (C), magenta (M), yellow (Y), and black (Bk). However, the number of the heads in the printhead 28 is not restricted to this embodiment. For example, the printhead containing two heads each having two-color composition may be used instead.

The nozzle sequence distance of the printhead 28 of this embodiment is about 1.27 inches, and this nozzle sequence distance is larger than the conventional printhead.

The ink cartridge 135 of this embodiment is disposed in the predetermined position that is distant from the disposed position of the printhead 28, in order to reduce the weight of the printhead 28 and enable high-speed printing of the printhead 28. The ink in the ink cartridge 135 is supplied to the printhead 28 by the operation of the pump (not illustrated) via the ink supply tube (not illustrated).

The composition in which the ink cartridge 135 is disposed at a different position than the disposed position of the printhead 28 enables the use of a large-scaled ink cartridge meeting the increased amount of consumption of the ink accompanied with high-speed printing of the printhead 28.

The ink cartridge 135 of this embodiment comprises two black (Bk) ink cartridges, a cyanogen (C) ink cartridge, a magenta (M) ink cartridge, and a yellow (Y) ink cartridge. In the ink cartridge mounting part 30, the five ink cartridges in total are accommodated.

In the printing part 2 of the above-mentioned composition, when the ink jet engine 25 carries out an ink-jet printing process to the recording sheet sent from the conveyance roller 24, an image is formed on the recording sheet. This image formation operation is performed by repeating the two-way movement of the carriage in the main scanning direction.

The recording sheet on which the image is formed is conveyed in the condition where the printed side of the sheet is turned up by the sheet output rollers 12, and the recording sheet is inverted by the reversal rollers 13 so that the printed side of the recording sheet is turned down. The recording sheet is then ejected to the sheet ejection tray of the sheet ejection part 3 by means of the ejection rollers 14.

When printing of two or more recording sheets is needed, the sheet feeding, the image formation, and the sheet ejection which have been mentioned above are repeated.

The conveyance passage of the recording sheet from the sheet feeding part 21 to the sheet ejection part 4 is constructed as indicated by the one-dot chain line in FIG. 2. The sheet ejection rollers 12, the reversal rollers 13, and the ejection rollers 14 are suitably disposed at the predetermined positions on this conveyance passage.

In the case of the ink jet-type image forming device, it is necessary to construct the conveyance passage between the printing part 2 and the sheet ejection part 3 to have an adequately large distance so that the ink printed on the recording sheet by the printing part 2 dries up through the passing of the conveyance passage.

In the case in which the ink printed on the recording sheet dries enough, even when the recording sheet contacts the conveyance rollers and the guide plate which constitute this conveyance passage, the occurrence of a fault of the formed image on the recording sheet can be prevented.

The sheet ejection cover 42 is rotatably supported on the portion where the reversal rollers 13 of the printing part 2 are arranged. In the condition where the sheet ejection cover 42 is opened, the conveyance passage of the portion where the reversal rollers 13 are disposed is opened to the outside, and the jammed sheet on the conveyance passage of this portion is easily removable.

As shown in FIG. 1, the front cover 51 provided in the front of the image forming device 1 is a foldaway cover which is opened when exchanging the ink cartridge 135. In the condition where the front cover 51 is opened to the outside, the ink cartridge 135 contained in the ink cartridge mounting part 30 appears, and it can be easily exchanged with a new ink cartridge 135.

As shown in FIG. 2, the sensor 36 for detecting the opened/closed condition of the front cover 51 is disposed inside the image forming device 1.

As shown in FIG. 1, the conveyance cover 52 and the engine cover 53 are the component parts which constitute the sheet ejection tray of the sheet ejection part 3. The conveyance cover 52 and the engine cover 53 are disposed to form the partition between the printing part 2 and the sheet ejection part 3.

The conveyance cover 52 comprises the handle part 52a for opening and closing the cover 15 which will be mentioned later. In the condition where the conveyance cover 52 is opened, the recording-sheet conveyance passage in the downstream portion of the ink jet engine 25 is opened.

In the condition where the engine cover 53 is opened, the upper surface of ink jet engine 25 is opened.

When the jam of a recording sheet occurs on the recording sheet conveyance passage of the downstream of ink jet engine 25, the jammed sheet on the conveyance passage of this portion can be easily removed by opening both the conveyance cover 52 and the engine cover 53.

As shown in FIG. 2, the sensor 37 for detecting the switching condition of engine cover 53 is disposed.

As shown in FIG. 1, side cover 54 is formed in the right-hand side of the image forming device 1. In the condition where side cover 54 is opened, the recording sheet conveyance passage from the sheet feeding part 21 to ink jet engine 25 is opened.

When the jam of a recording sheet occurs on the recording sheet conveyance passage from the sheet feeding part 21 to ink jet engine 25, the jammed sheet on the conveyance passage of this portion can be easily removed by opening the side cover 54.

As shown in FIG. 2, the sensor 38 for detecting the switching condition of side cover 54 is disposed.

The pivoted cover 15 forms a part of the sheet ejection tray, and this cover 15 is disposed in the sheet ejection part 3. Specifically, the cover 15 comprises the two plate members 15a and 15b, the rotation shaft which is fixed onto the bottom of the sheet ejection part 3 and pivotably supports the plate member 15a thereon, and the rotation shaft 16 which is fixed on the plate member 15a and pivotably supports the plate member 15b on the plate member 15a.

The plate members 15a and 15b are connected to each other by the rotation shaft 16. The plate member 15a is rotatably supported on the sheet ejection tray such that the plate member 15a is rotatable around the rotation shaft on the bottom of the sheet ejection part 3. When the cover 15 is opened, the two plate members 15a and 15b are folded up in the folded condition as indicated by the dotted line in FIG. 2. In this condition, the plate member 15a is rotated around the rotation shaft on the bottom of the sheet ejection part 3 with the rotation shaft being used as the fulcrum.

The image reading part 4 is disposed below the contact glass 17, and the scanner for reading the image of an original document set on the contact glass 17 is movable within the image reading part 4. This scanner optically reads the image of the original document.

In the image reading part 4, the light source emits the light, and the reflected light from the original document in reply to the light emitted by the light source is sent to the CCD through the mirror, the lens, etc, so that the reading of the image of the original document is performed.

The pressure plate 18 which is capable of being opened and closed by the user is disposed above the contact glass 17. At the time of reading the image of the original document, the original document is set on the contact glass 17, and the original document is pressed by the pressure plate 18. This pressure plate 18 serves to prevent the penetration of the light from the outside into the image reading part. The contact glass 17 is made of a highly transparent glass.

In the conveyance passage from the ink jet engine 25 to the reversal roller 13, the guide plate 19 for guiding conveyance of a recording sheet is disposed. The guide plate 19 has a plurality of rowel-like rollers 19a disposed at the predetermined positions of the guide plate 19 where the rollers 19a confront the plurality of conveyance rollers including the sheet output rollers 12 and the reversal rollers 13 disposed in the lower position of the conveyance passage.

In this embodiment, the ink-jet type image forming device 1 is used, and the conveyance passage from the ink jet engine 25 to the reversal roller 13 is configured to provide a comparatively large distance in order to guide the conveyance of the recording sheet while the ink printed on the recording sheet by the ink jet engine 25 dries adequately.

The pivoted cover 41 forms a part of the engine cover 53, and this cover 41 is disposed adjacent to the edge of the cover 15 of the sheet ejection part 3. When the cover 41 is opened, the upper surface of the ink jet engine 25 is opened.

In the image forming device 1 of FIG. 2, the jam of a recording sheet which is fed from the sheet feeding part 21 may occur on the conveyance passage before the recording sheet is ejected to the sheet ejection tray.

When the jam of a recording sheet occurs on the conveyance passage between the feeding means 23 and the printing part 2, the jammed recording sheet can be easily removed by opening the side cover 54 and making it in the opened condition.

When the jam of a recording sheet occurs on the conveyance passage between the reversal roller 13 and the ejection roller 14, the jammed recording sheet can be easily removed by opening the sheet ejection cover 42 and making it in the opened condition.

However, when the jam of a recording sheet occurs on the conveyance passage between the ink jet engine 25 and the reversal roller 13, it is difficult to eliminate the jammed recording sheet even if the side cover 54 and the sheet ejection cover 42 are opened.

In order to solve the problem, the image forming device of this embodiment is configured such that, even when the jam of a recording sheet occurs on the conveyance passage between the ink jet engine 25 and the reversal roller 13, the jammed recording sheet can be easily removed. That is, the pivoted cover 15 which is capable of being opened and closed is disposed near the above-mentioned conveyance passage so as to constitute a part of the sheet ejection tray of the sheet ejection part 3.

Specifically, when the jam of a recording sheet occurs on the conveyance passage from the ink jet engine 25 to the reversal roller 13, the cover 15 of the sheet ejection part 3 is opened by the user and set in the opened condition as indicated by the dotted line in FIG. 2. If the user puts the hand into the opening where the cover 15 is opened, the jammed sheet can be easily removed.

Figure 3:
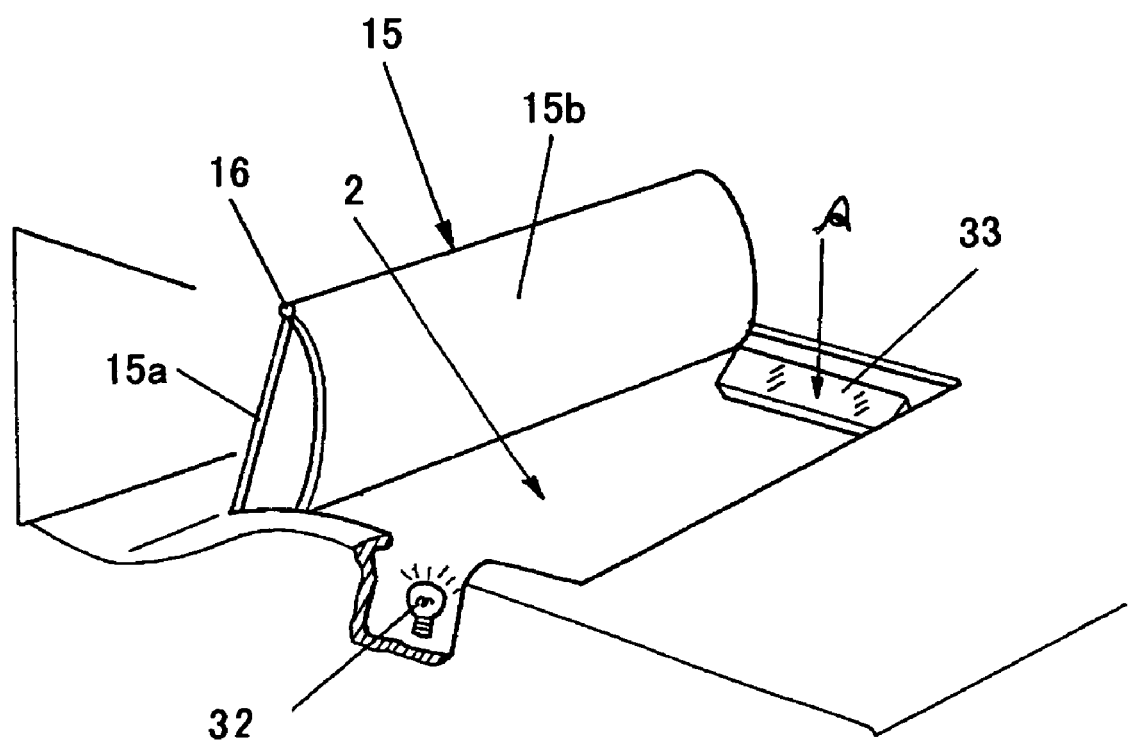
FIG. 3 is a perspective view showing the composition of the sheet ejection part and the printing part in the image forming device in another embodiment of the present invention.

FIG. 3 shows the composition of the sheet ejection part and the printing part in the image forming device in another embodiment of the present invention. In FIG. 3, the elements which are the same as corresponding elements in FIG. 2 are designated by the same numerals, and a description thereof will be omitted.

In the image forming device of this embodiment, the lighting 32 is disposed near the printing part 2 that is used as the image formation part, so that the conveyance passage of the recording sheet near the printing part 2 may be illuminated by the lighting 32 when the cover 15 is opened as shown in FIG. 3.

It is appropriate that the position where the lighting 32 is disposed in the image forming device is the place to which the illumination in the case of the jam processing is directed most efficiently, the place which becomes a shadow and is not easily visible to the user, or the place which is concealed from the angle of the user in front of the image forming device.

In this embodiment, the switch (not shown) for turning ON and OFF the lighting 32 is provided so that the switching ON/OFF of the lighting 32 is interlocked with the opening/closing of the cover 15. Namely, when the user opens the cover 15, the lighting 32 is automatically turned on by the opening of the cover 15.

Alternatively, the image forming device may be configured so that such interlocking-type switch is not provided, and the user can turn the lighting 32 ON arbitrarily.

Alternatively, the transparent area for entering the external light into the cover 15 may be provided in the outside cover in front of the image forming device. However, the brightness of the transparent area in such alternative embodiment is inferior to that of the lighting 32 in the above-mentioned embodiment.

In the image forming device of the embodiment of FIG. 3, the lighting 32 which illuminates the neighborhood of the printing part 2 is provided. Even when the jam of a recording sheet occurs near the printing part 2, the lighting 32 illuminates the jammed recording sheet near the printing part 2 and the visibility is increased, so that the ease of removing the jammed sheet by the user improves.

Moreover, in the embodiment of FIG. 3, the mirror 33 is disposed in the position near the printing part 2 which can be recognized visually from the opening that is formed when the cover 15 is opened by the user. Specifically, in this example, the mirror 33 is disposed at the back-side portion of the image forming device opposite to the lighting 32. However, the portion where the mirror 33 is disposed other than the portion in this example may be chosen suitably.

In this embodiment, the mirror 33 is disposed at the portion corresponding to the user's dead angle, and the concealed portion can be seen by the user using the mirror 33. The mirror 33 is usually made of glass. Alternatively, other materials than glass may be used as the base material of the mirror 33.

In the present embodiment, the mirror 33 is disposed near the printing part 2, the position and condition of the jammed recording sheet near the printing part 2 can be recognized visually using the mirror 33 even when the jam occurs near the printing part 2, so that the ease of removing the jammed sheet by the user improves.

Figure 4:
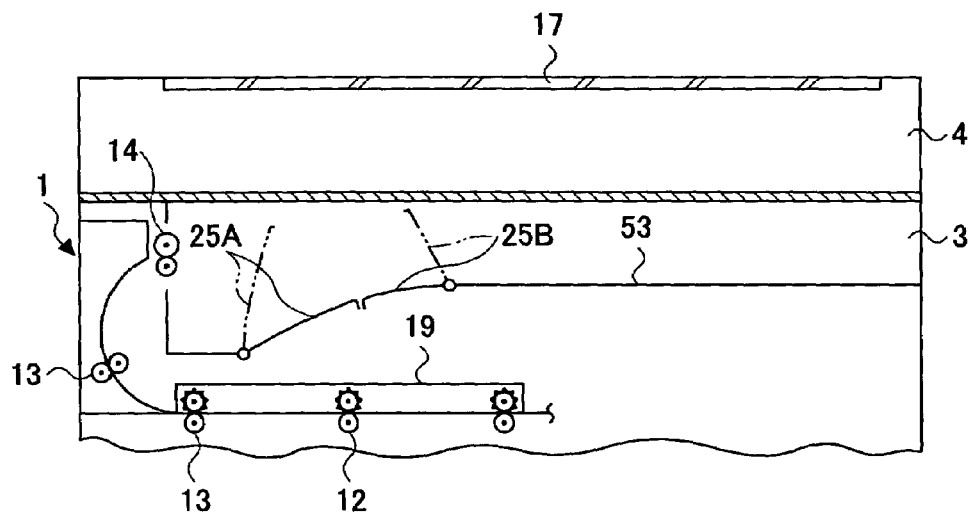
FIG. 4 is a diagram showing the composition of the sheet ejection part in the image forming device in another embodiment of the present invention.

FIG. 4 shows the composition of the sheet ejection part in the image forming device in another embodiment of the present invention. In FIG. 4, the elements which are the same as corresponding elements in FIG. 2 are designated by the same reference numerals, and a description thereof will be omitted.

In the image forming device of this embodiment, the cover which forms a part of the sheet ejection tray on the bottom of the sheet ejection part 3 is formed with a set of two pivoted covers 25A and 25B. The cover of this embodiment is configured so that the respective covers 25A and 25B may be opened in mutually opposite directions. Other composition in this embodiment is the same as that of the image forming device of FIG. 2. Since the covers 25A and 25B according to this embodiment constitute the double-doored cover which is capable of being opened and closed by a rotating operation, the structure of the cover can be simplified.

As indicated by the dotted line in FIG. 4, the double doors of the set of two pivoted covers 25A and 25B can be opened and closed in the mutually opposite directions.

Since a large opening can be formed in the sheet ejection tray, when the jam of a recording sheet occurs on the conveyance passage of the lower part of the sheet ejection tray etc., the ease of removing the jammed recording sheet by the user improves.

Figure 5:
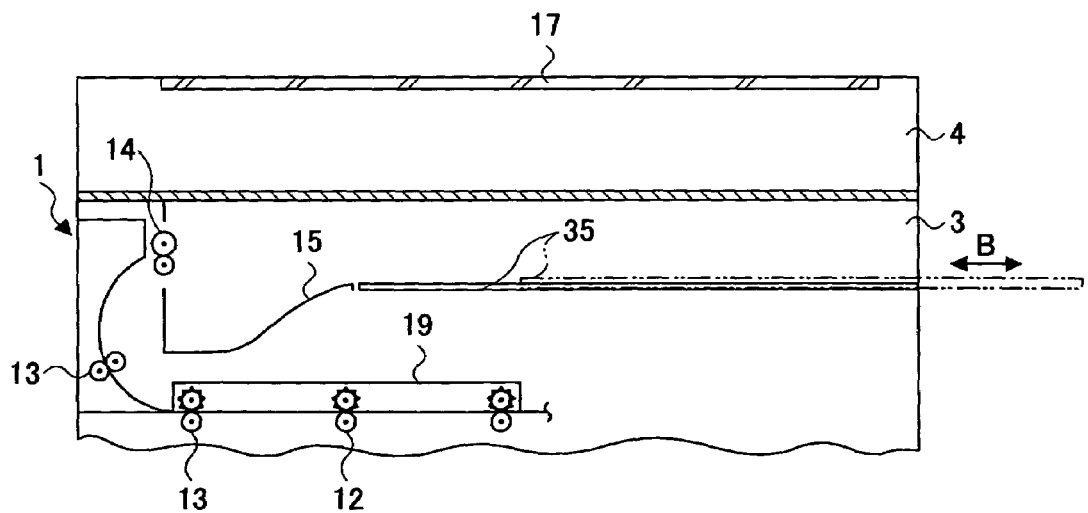
FIG. 5 is a diagram showing the composition of the sheet ejection part in the image forming device in another embodiment of the present invention.

FIG. 5 shows the composition of the sheet ejection part in the image forming device in another embodiment of the present invention. In FIG. 5, the elements which are essentially the same as corresponding elements in FIG. 2 are designated by the same reference numerals, and a description thereof will be omitted.

The image forming device of this embodiment differs from the image forming device of FIG. 2 in that the cover provided in the sheet ejection tray on the bottom of the sheet ejection part 3 is the sliding-door cover 35 which is capable of being opened and closed by the slide operation in the direction indicated by the arrow B of FIG. 5. Other composition in this embodiment is the same as that of the image forming device of FIG. 2.

The cover 35 of this embodiment is of the slide type, and the cover 35 does not interfere with the bottom of the image reading part 4 even when the cover 35 is set in the opened condition. There is no need to rotate the cover 15 which may interfere with the bottom of the image reading part 4 as in the opened condition of the cover 15 in the embodiment of FIG. 2.

Therefore, since a large opening can be formed in the sheet ejection tray by sliding the sliding-door cover 35 when the jam of a recording sheet occurs on the conveyance passage in the lower part of the sheet ejection tray, the ease of removing the jammed recording sheet by the user improves.

Figure 6:
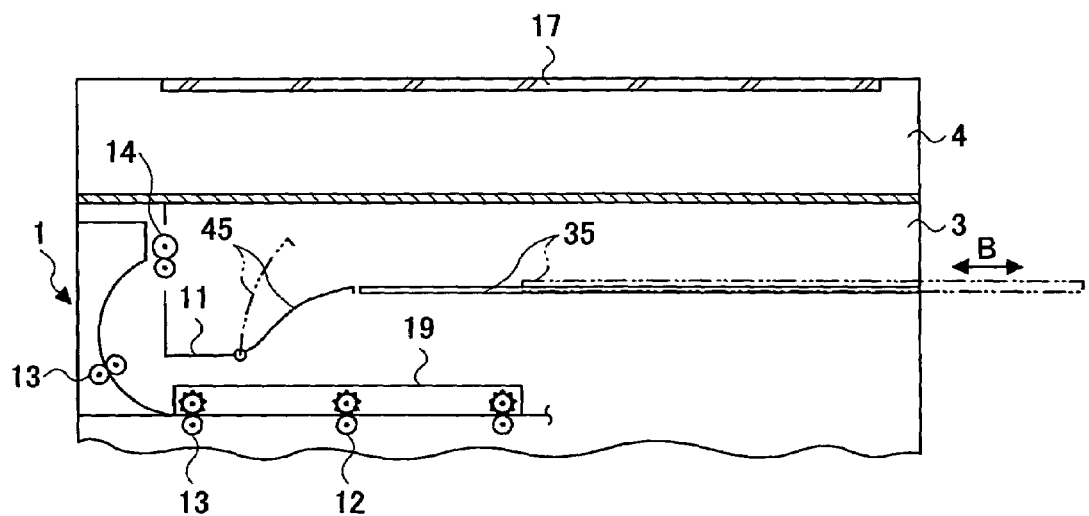
FIG. 6 is a diagram showing the composition of the sheet ejection part in the image forming device in another embodiment of the present invention.

FIG. 6 shows the composition of the sheet ejection part in the image forming device in another embodiment of the present invention. In FIG. 6, the elements which are essentially the same as corresponding elements in FIG. 5 are designated by the same reference numerals, and a description thereof will be omitted.

The image forming device of this embodiment differs from the image forming device of FIG. 5 in that the pivoted cover 45 capable of being opened and closed by a rotating operation, and the sliding-door cover 35 capable of being opened and closed by a sliding operation in the direction indicated by the arrow B in FIG. 6 are disposed in the sheet ejection tray used as the bottom of the sheet ejection part 3. Other composition is the same as that of the image forming device of FIG. 5.

In this embodiment, the sliding-door cover 35 and the pivoted cover 45 which differ in the opening/closing method are provided in the sheet ejection tray. When the jam of a recording sheet occurs on the conveyance passage of the lower part of the sheet ejection tray, one of the cover 35 and the cover 45 or both corresponding to the position of the jammed recording sheet can be opened selectively.

Even in the case where the image forming device of FIG. 6 is installed with a narrow installation space on the right-hand side of the image forming device and the sliding-door cover 35 cannot be moved, the pivoted cover 45 can be opened by a rotating operation, and the jammed recording sheet can be easily removed.

Figure 7:
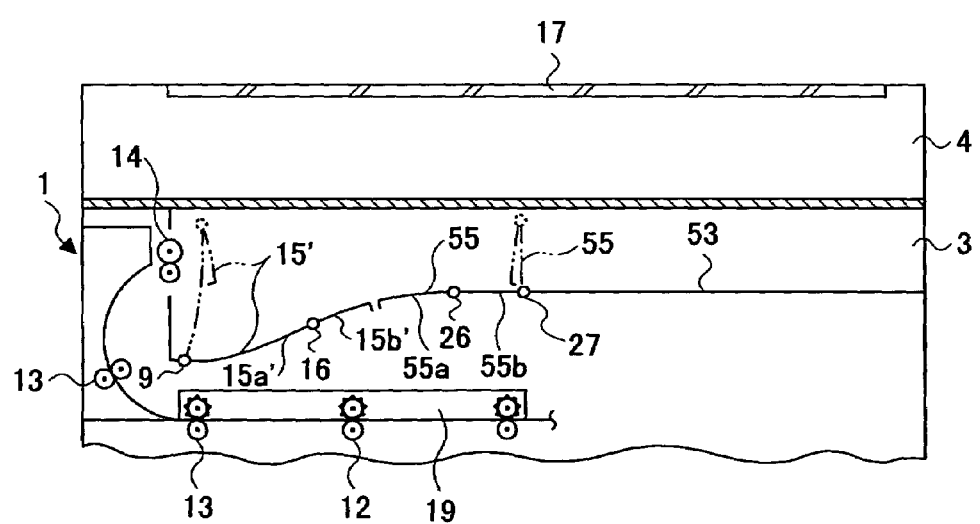
FIG. 7 is a diagram showing the composition of the sheet ejection part in the image forming device in another embodiment of the present invention.

FIG. 7 shows the composition of the sheet ejection part in the image forming device in another embodiment of the present invention. In FIG. 7, the elements which are essentially the same as corresponding elements in FIG. 2 are designated by the same reference numerals, and a description thereof will be omitted.

The image forming device of this embodiment differs from the image forming device of FIG. 2 in that the double-doored cover 15' which is capable of being opened and folded up in the folded condition and similar to the cover 15 in the embodiment of FIG. 2, and the double-doored cover 55 which confronts the cover 15' and is capable of being opened and folded up in the folded condition are disposed in the sheet ejection tray on the bottom of the sheet ejection part 3. Other composition in this embodiment is the same as that of the image forming device of FIG. 2.

Specifically, the cover 15' in this embodiment comprises a set of two plate members 15a' and 15b', the rotation shaft 9 fixed onto the bottom of the sheet ejection part 3 and pivotably supporting the plate member 15a' thereon, and the rotation shaft 16 fixed onto the plate member 15a' and pivotably supporting the plate member 15b' on the plate member 15a'. When the cover 15' is opened, the two plate members 15a' and 15b' are folded up in the folded condition as indicated by the dotted line in FIG. 7. Moreover, the cover 55 in this embodiment confronts the cover 15' and comprises a set of two plate members 55a and 55b, the rotation shaft 27 fixed onto the bottom of the sheet ejection part 3 and pivotably supporting the plate member 55b thereon, and the rotation shaft 26 fixed onto the plate member 55b and pivotably supporting the plate member 55a on the plate member 55b. When the cover 55 is opened, the two plate members 55a and 55b are folded up in the folded condition as indicated by the dotted line in FIG. 7.

Therefore, a large opening can be formed in the sheet ejection tray by providing the double-doored cover 15' and the double-doored cover 55 which are both folded up in the folded condition, and the ease of removing the jammed recording sheet by the user improves.

Figure 8:
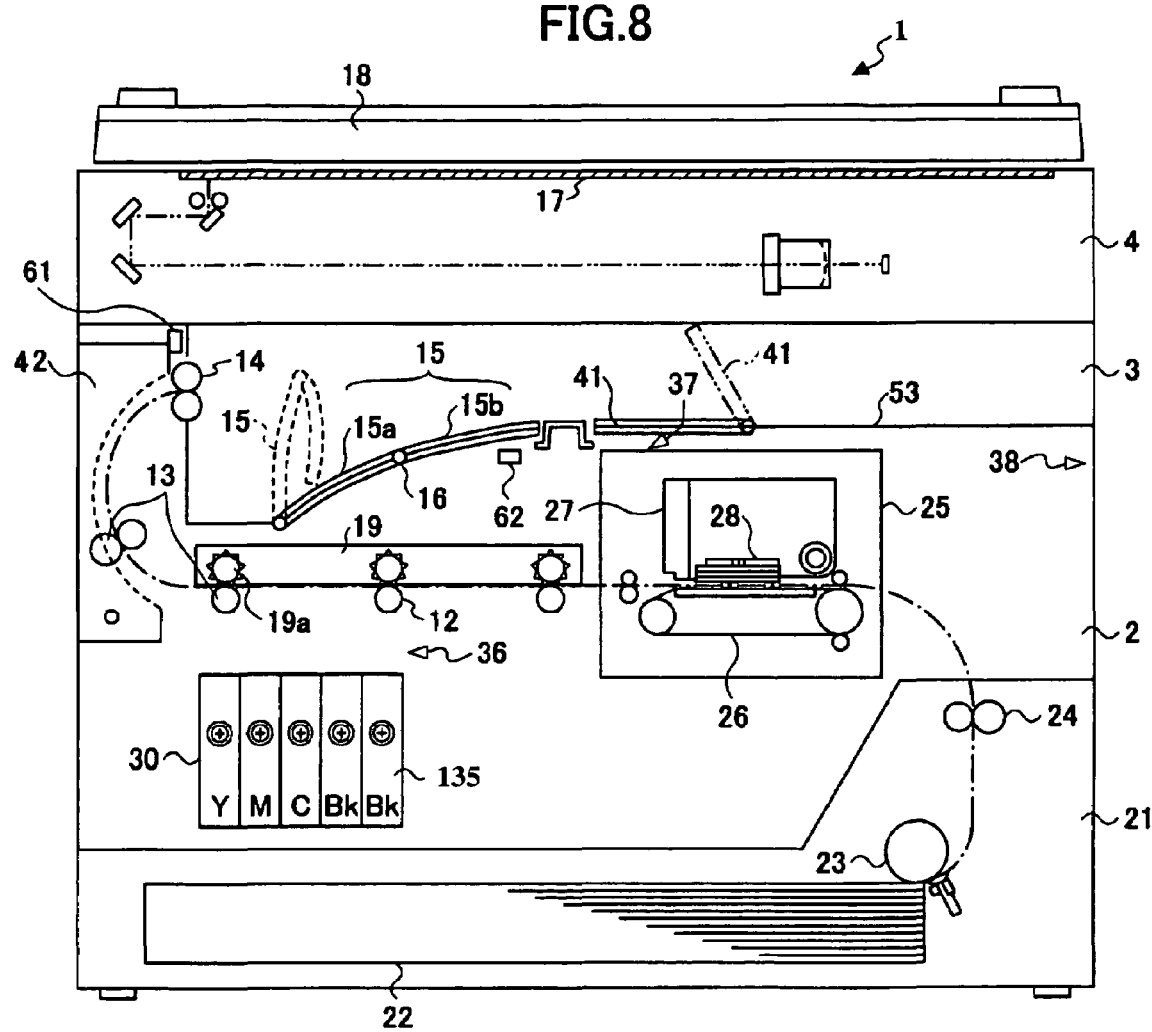
FIG. 8 is a cross-sectional view of the internal composition of the image forming device in another embodiment of the present invention.

FIG. 8 shows the internal composition of the image forming device in another embodiment of the present invention. In FIG. 8, the elements which are essentially the same as corresponding elements in FIG. 2 are designated by the same reference numerals, and a description thereof will be omitted.

The image forming device of FIG. 8 is configured so that the sheet ejection cover 42 capable of being opened and closed is disposed at a downstream position of the printing part 2 separate from the position of the cover 15 in the sheet ejection part 3, and an interlock switch 61 is disposed at the sheer ejection cover 42. When the sheet ejection cover 42 is opened, the opening of the cover 15 in the sheet ejection part 3 is inhibited by a result of detection of the opened condition of the sheet ejection cover 42 by the interlock switch 61. Other composition in this embodiment is the same as that of the image forming device of FIG. 2, and an explanation thereof will be omitted.

The opening of the cover 15 is inhibited using the locking mechanism 62, and this locking mechanism 62 locks the hook of the cover 15 by actuating the solenoid of the locking mechanism 62 when the interlock switch 61 detects the sheet ejection cover 42 as being in the opened condition. When the interlock switch 62 detects the sheet ejection cover 42 as being in the closed condition, the opening of the cover 15 is allowed using the locking mechanism 62 which unlocks the hook of the cover 15.

The composition in which the interlock switch 61 is provided to inhibit the opening of the cover 15 is applicable also to the above-mentioned embodiments in FIG. 4 through FIG. 7.

Figure 9:
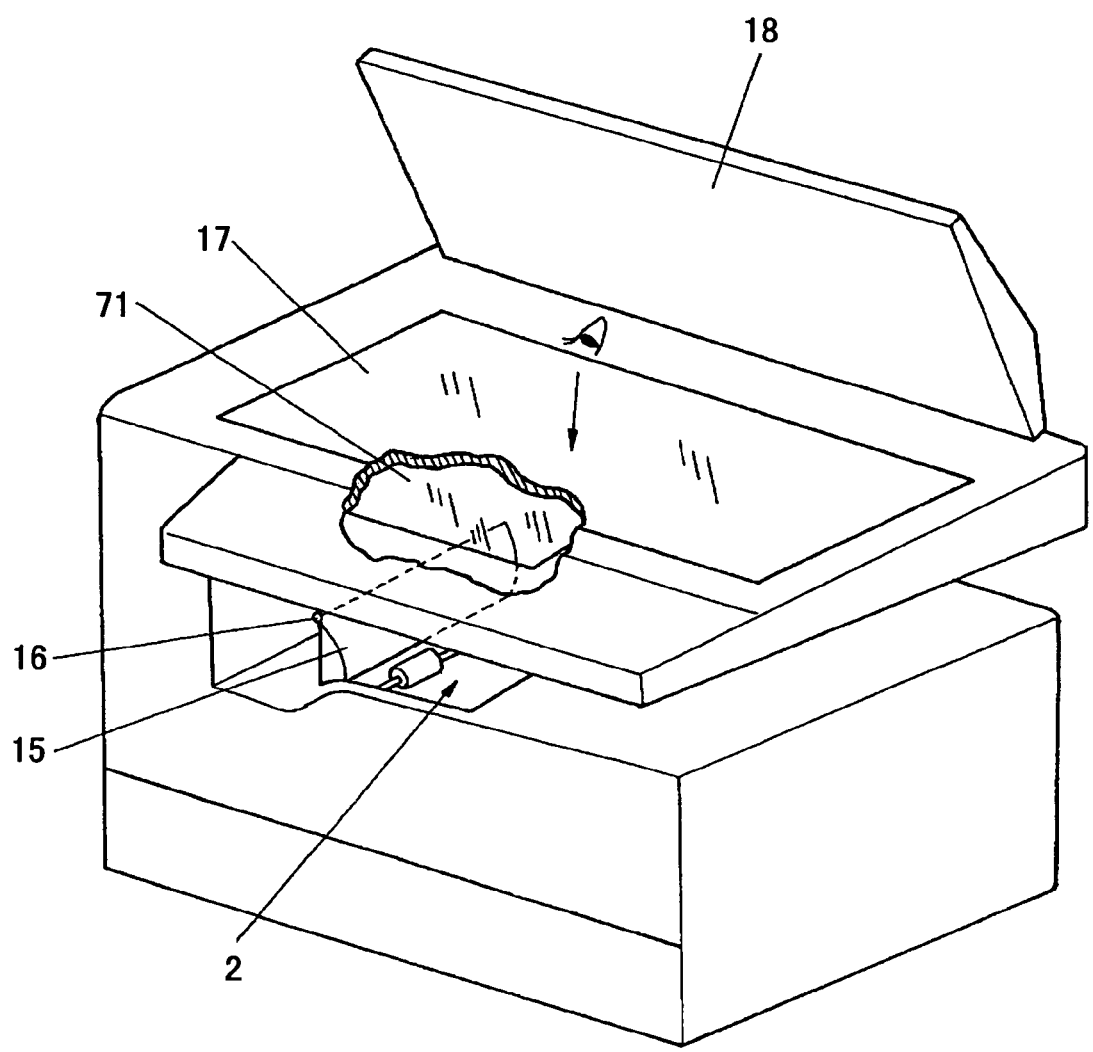
FIG. 9 is a perspective view showing the composition of the image reading part in the image forming device in another embodiment of the present invention.

FIG. 9 shows the composition of the image reading part in the image forming device in another embodiment of the present invention. In FIG. 9, the elements which are essentially the same as corresponding elements in FIG. 2 are designated by the same reference numerals, and a description thereof will be omitted.

In the embodiment of FIG. 9, a transparent region 71 is formed on the bottom of the image reading part. The transparent region 71 may be formed by disposing a glass plate at the portion of the bottom of the image reading part 4 corresponding to the cover 15.

The embodiment of FIG. 9 is configured so that, when the cover 15 is in the opened condition, the downstream portion of the printing part 2 corresponding to the lower position of the sheet ejection part 3 can be visually recognized through the transparent region 71 and the opened portion of the cover 15 as shown in FIG. 9.

The material of the transparent region 71 may be a resin, glass, etc. Although the resin is less expensive than the glass, the transparency of the resin is inferior to that of the glass, and the flaw resistance of the resin is relatively low.

On the other hand, although the glass is more expensive than the resin, the transparency of the glass is excellent and the flaw resistance of the glass is relatively high. For the purpose of securing the visibility of the jammed sheet, the glass is more suitable as the material of the transparent region 71.

Alternatively, the transparent region 71 may be provided to cover the whole bottom of the image reading part 4 including the portion of the image reading part 4 corresponding to the cover 15.

In the image forming device of this embodiment, the cover 15 capable of being opened and closed is provided to constitute a part of the sheet ejection tray in the sheet ejection part 3, and the transparent region 71 is provided in the portion of the bottom of the image reading part 4 corresponding to the cover 15.

When the jam of a recording sheet occurs on the conveyance passage from the ink jet engine 25 to the reversal roller 13, the cover 15 of the sheet ejection part 3 is opened as indicated by the dotted line in FIG. 2, so that the cover 15 is set in the opened condition. Since the bottom of the image reading part 4 corresponding to the cover 15 is formed as the transparent region 71 if the opening formed when the cover 15 is opened is looked into through the transparent contact glass 17, the printing part 2 located below the sheet ejection part 3 can be seen clearly. If the user puts the hand into the opening formed when the cover 15 is opened, the jammed recording sheet can be easily removed.

In the image forming device of this embodiment, the jammed sheet in the printing part 2 can be checked with good visibility even if the image reading part 4 is disposed above the sheet ejection part 3. The operability of removing the recording sheet by the user improves, and the image reading part 4 is not influenced at the time of the jam processing.

In addition, it is preferred that the image forming device of this embodiment comprises the pivoted shutter having a size to cover the whole transparent region 71 and shading the transparent region 71, the pivoted shutter being disposed on the upper surface or the lower surface of the transparent region 71 provided on the bottom of the image reading part 4.

The pivoted shutter may be set in the closed condition to shade the transparent region 71, and it is possible to prevent the external light from entering into the image reading part 4. For this reason, the influence of the external light on the image reading part 4 can be prevented.

The present invention is provided with the sheet ejection part which stacks the recording sheet to the upper part of an image formation part, and it is widely applicable to the image forming device which equipped the upper part of the sheet ejection part with the image reading part.

The present invention is not limited to the above-described embodiments, and variations and modifications may be made without departing from the scope of the present invention.

What is claimed is:

1. An image forming device comprising:
   an ink-jet printing part forming an image on a recording sheet by performing an ink-jet printing process using ink;
   a carriage holding the ink-jet printing part and being arranged to be movable in a main scanning direction;
   a sheet feeding part feeding the recording sheet to a printing position where the image is formed on the recording sheet by the ink-jet printing part;
   a sheet reversing part arranged along a substantially horizontal and straight conveyance passage of the recording sheet extending from a downstream position of the ink-jet printing part, the sheet reversing part conveying the recording sheet along the substantially horizontal and straight conveyance passage, inverting the recording sheet so that an image-printed side of the recording sheet faces down, and ejecting the inverted recording sheet to a sheet ejection tray, wherein the sheet reversing part includes a guide plate and a sheet ejection cover, the guide plate forming the substantially horizontal and straight conveyance passage and guiding conveyance of the recording sheet in a part of the conveyance passage from the ink-jet printing part to the sheet ejection cover, the sheet ejection cover including a curved guide inverting the recording sheet upside down;
   a sheet ejection part provided above the ink-jet printing part and the guide plate, and stacking the recording sheet with the image being formed by the ink-jet printing part, which is inverted by the sheet ejection cover; and
   an image reading part provided above the sheet ejection part and reading an image of an original document,
   Wherein the sheet ejection part includes at least a conveyance cover which is capable of being opened or closed to the sheet ejection part, and a part of the conveyance passage corresponding to the guide plate is opened to the outside of the image forming device by opening the conveyance cover,
   wherein the conveyance cover is a double-doored cover having first and second plate members, a first shaft fixed to a bottom of the sheet ejection part, and a second shaft between the first and second plate members, one end of the first plate member pivotably supported on the sheet ejection part bottom by the first shaft, one end of the second plate member pivotably supported on the other end of the first plate member by the second shaft, and when the conveyance cover is opened and folded up in a folded condition, the ink-jet printing part and a part of the conveyance passage adjacent to the ink-jet printing part are accessible.

2. An image forming device according to claim 1, wherein the sheet conveyance part comprises a plurality of conveyance rollers disposed in a lower position, and a guide plate having a plurality of rowel-like rollers disposed to confront the plurality of conveyance rollers.

3. An image forming device according to claim 1 wherein the cover is a sliding-door cover capable of being opened and closed by a slide operation.

4. An image forming device according to claim 1 wherein the cover comprises a pivoted cover capable of opened and closed by a rotating operation, and a sliding-door cover capable of being opened and closed by a slide operation.

5. An image forming device according to claim 1, wherein the cover is a double-doored cover having a set of two door members which are rotatable in mutually opposite directions.

6. An image forming device according to claim 1 further comprising an interlock switch disposed at the sheet ejection cover, wherein, when the sheet ejection cover is opened, opening of the conveyance cover of the sheet ejection part is inhibited by a result of detection of an opened condition of the sheet ejection cover by the interlock switch.

7. An image forming device according to claim 1 wherein a lighting is disposed near the image forming part, and when the cover is opened, the lighting illuminates a sheet conveyance passage near the image forming part.

8. An image forming device according to claim 1 wherein a mirror is disposed at a position where a lower portion of the sheet ejection part near the image forming part is visually recognizable from an opening which is formed when the cover is opened.

9. An image forming device according to claim 1 wherein the image reading part has a transparent region at a bottom position of the image reading part corresponding to a position of the cover in the sheet ejection part, and when the cover is set in the opened condition, a downstream portion of the image forming part is visually recognizable from the transparent region.

10. An image forming device according to claim 9 wherein a pivoted shutter having a size to cover a whole transparent region is disposed, and the pivoted shutter is capable of being opened and closed.

* * * * *